United States Patent [19]

Duncan et al.

[11] Patent Number: 4,490,400

[45] Date of Patent: Dec. 25, 1984

[54] SPOONABLE TOMATO PRODUCT AND METHOD OF MAKING THE SAME

[75] Inventors: Norman P. F. Duncan; James E. Sexton, both of Cincinnati, Ohio

[73] Assignee: Mallinckrodt, Inc., St. Louis, Mo.

[21] Appl. No.: 454,147

[22] Filed: Dec. 29, 1982

[51] Int. Cl.$^3$ .............................................. A23L 1/24
[52] U.S. Cl. ................................ 426/335; 426/532; 426/589; 426/605; 426/613; 426/615
[58] Field of Search .............. 426/589, 605, 613, 615, 426/335, 532

[56] References Cited

U.S. PATENT DOCUMENTS

| | | |
|---|---|---|
| 1,921,585 | 8/1933 | Rooker et al. ................ 426/605 X |
| 2,170,518 | 8/1939 | Musher ........................... 426/613 X |
| 2,912,338 | 11/1959 | Barnes et al. . |
| 3,650,770 | 3/1972 | Marotta et al. . |
| 3,788,862 | 1/1974 | Hoover et al. . |
| 3,873,753 | 3/1975 | Nelson et al. . |
| 4,089,981 | 5/1978 | Richardson . |
| 4,107,335 | 8/1978 | Glickstein et al. ............ 426/605 X |
| 4,156,021 | 5/1979 | Richardson . |
| 4,336,272 | 6/1982 | Verrips et al. . |
| 4,352,832 | 10/1982 | Wood et al. ................... 426/613 X |

FOREIGN PATENT DOCUMENTS 495495  8/1977  Australia ............................ 426/605

OTHER PUBLICATIONS

Woman's Day Encyclopedia of Cookery, vol. 10, Fawcett Publ., Inc., N.Y., 1966, pp. 1621, 1622.
Woman's Day Encyclopedia of Cookery, vol. 5, Fawcett Publ., Inc., N.Y., 1966, p. 695.
Lord, I. E., Everybody's Cookbook, Harcourt, Brace and Co., N.Y., 1924, 1937, p. 463.
Lopez, A., "A Complete Course in Canning", The Canning Trade, Balt. Md., 1969, pp. 258, 259, 264, 265.
Pillsbury's Soup & Salad Cook Book, Pillsbury Publications, 1969, pp. 18, 19, 30 and 31.

*Primary Examiner*—Robert Yoncoskie
*Attorney, Agent, or Firm*—Wood, Herron & Evans

[57] ABSTRACT

A spoonable tomato product and method of making the same comprising a water-in-oil emulsion component and a natural pulpy tomato solids component wherein said components are in amounts proportioned to provide a spoonable product which is stable during use and storage. The emulsion component contains at least about 60% w/w edible oil and the tomato component contains at least about 75% w/w natural pulpy tomato solids. The natural tomato solids impart a natural grainy, pulpy texture to the spoonable product. The emulsion component formulates a water-in-oil emulsion that imparts a spoonable consistency having the characteristics and stability similar to mayonnaise. These spoonable tomato products may be stored and used for an appreciable amount of time without experiencing rapid biodegradation or serious putrefaction. Thus, these spoonable tomato products are especially suitable for use in food products for the fast food market. Also, novel methods for preparing a spoonable tomato product consisting of a natural pulpy tomato solids component and a water-in-oil component are disclosed.

32 Claims, No Drawings

SPOONABLE TOMATO PRODUCT AND METHOD OF MAKING THE SAME

BACKGROUND OF THE INVENTION

In the food industry, it is desirable to use in food products and fast foods freshly harvested tomato components for flavor, color and texture. The commercial use of freshly harvested tomato components, however, can be impractical since they are subject to rapid biodegradation and putrefaction. In the past to avoid such spoilage, freshly harvested tomato components have been quickly processed into conventional tomato solids such as tomato paste, tomato juice, tomato sauce, tomato puree, and the like. The quick processing of freshly harvested tomatoes has aimed to make practical the commercial use of tomato components in food products and fast foods. In accomplishing the above, processors have attempted to provide a tomato product that can be stored for subsequent use without experiencing spoilage or serious deterioration. Unfortunately, most such attempts have been directed to providing storable concentrated tomato products that require additional processing steps following storage to obtain desired ready-to-use tomato end products.

Heretofore, tomato paste, tomato juice, tomato sauce, or tomato puree have been combined with fillers to formulate an edible simulated tomato product that can be stored. Such natural pulpy tomato solids are used to impart the characteristic tomato flavors and colors. The fillers on the other hand impart body, artificial texture and stability. One such example, as disclosed in U.S. Pat. No. 2,912,338, has involved a product consisting of tomato paste, tomato puree and starch combined with an edible fat or oil not to exceed a maximum proportion of 10% oil by weight of the mixture. Another product, as set forth in U.S. Pat. No. 3,788,862, has disclosed a product which incorporates tomato juice and tomato paste with an admixture of starch, de-oiled meal, and animal protein. Unfortunately, the fillers incorporated therein fail to impart a natural grainy, pulpy texture to the simulated tomato product. Still another product, as disclosed in U.S. Pat. No. 3,650,770, which primarily is designed to impart artificially a grainy, pulpy, texture to the resulting simulated tomato product, involves the incorporation of a pregelatinized starch therein. In this case, the technique requires the pregelatinized starch to be combined with sufficient amounts of water and thereafter heated to impart the grainy, pulpy texture. However, the grainy, pulpy texture is incurred artificially due to the swelling characteristics of the pregelatinized starch. Further, copious amounts of water needed may detract from the color and taste of the simulated tomato product.

In addition, a method for processing and storing freshly harvested tomatoes has been disclosed in U.S. Pat. No. 3,873,753. In this case, a fresh crushed tomato product is sterilized, acidified and stored in bulk over a long period of time without spoiling or seriously deteriorating. Nevertheless, additional processing steps are required following storage of said crushed tomato products to formulate desired ready-to-use tomato end products.

It is apparent from the above brief overview of tomato products that there are commercial needs to provide tomato products that closely resemble natural tomatoes, which are prepared into ready-to-use tomato end products in advance and can be stored for subsequent on demand use without experiencing any serious bacterial contamination or deterioration.

SUMMARY OF THE INVENTION

This invention relates to a spoonable tomato product and methods of making the same comprising a water-in-oil emulsion component and a natural pulpy tomato solids component wherein said components are in amounts proportioned to provide a spoonable product which is stable during use and storage. The novel spoonable tomato products and methods of making the same enable said products to be stored for an appreciable period of time without undergoing spoilage or serious deterioration. Through the use of the novel process, a spoonable tomato product can be produced into ready-to-use tomato end products in advance and stored for subsequent and on demand use in food products in fast foods. Thus, it is possible by practicing the novel method to eliminate the heretofore additional processing steps needed to formulate a desired tomato end product following storage of conventional natural pulpy tomato solids.

It has also been an important objective of the invention to provide a novel, spoonable tomato product which exhibits a more natural tomato-like, grainy, pulpy texture with desired mayonnaise-like mouth taste, feel and eye appeal than heretofore obtainable. In formulating these novel tomato products, a natural pulpy tomato solids component is combined with a water-in-oil emulsion component. The natural pulpy tomato solids component preferably contains natural grainy, pulpy pieces of tomatoes which are derived and cut from fresh, cooked, canned or frozen tomato products. The water-in-oil emulsion component preferably contains at least about 60% w/w edible oil. It has been found quite unexpectedly that the use of such preferred natural pulpy tomato solids component combined with the water-in-oil emulsion component imparts a spoonable tomato product having a more natural grainy, pulpy tomato texture. Further, the use of a water-in-oil emulsion component imparts greater stability for the natural pulpy tomato solids component without interfering with the quality of tomato flavor or color. In addition, the use of a water-in-oil emulsion component imparts to the spoonable tomato product a more desirable mouth taste and feel enhancing overall consumer eye appeal. The novel spoonable tomato products of this invention and methods of making the same provide a tomato product that has the characteristics and stability similar to mayonnaise while more closely resembling the natural grainy, pulpy texture of tomatoes than heretofore obtained.

These and other objects of the present invention as well as its advantages will become apparent from the following detailed description, example and accompanying claims.

DETAILED DESCRIPTION OF THE INVENTION

In a presently preferred form, the spoonable tomato products of this invention comprises a water-in-oil emulsion component and a natural pulpy tomato solids component wherein said components are in an amount proportioned to provide a spoonable product which is stable during use and storage. More preferably, a spoonable tomato product comprises a water-in-oil emulsion component and a natural pulpy tomato solids component wherein said emulsion component and said natural pulpy tomato solids component are present in a ratio of about 1:3 to about 3:1 respectively, and more preferably, in a ratio of about 1:2 respectively.

In this specification, the term "spoonable" refers to a product that has the characteristics and stability of products like mayonnaise. Thus, the products of this invention are stable during use and storage in that under conditions of room temperature use, the product remains spoonable and does not lose its consistency or degrade. Like mayonnaise, it is desirable to refrigerate the spoonable tomato product when not in use. Further, reference is made throughout this specification to natural pulpy tomato solids. As used herein, natural pulpy tomato solids are natural pulpy tomato parts derived from pieces of natural or whole tomatoes which have been cut from fresh, cooked, canned or frozen tomato products.

The novel spoonable tomato products comprise a water-in-oil emulsion component wherein said tomato product contains said emulsion in an amount of about 25% w/w to about 80% w/w. The water-in-oil emulsion component contains an edible oil in an amount of about 60% w/w to about 80% w/w. In this specification, the terms "oil" and "fat" are used synonymously. Fats, however, may include hard fats selected from animal fats and vegetable and fish oils. Preferred hard fats may be obtained from butter fat, tallow, lard, soybean oil, coconut oil, palm oil, babassu oil, cotton seed oil, palm kernel oil, sunflower oil, corn oil, safflower oil, rape seed oil, and liquid shortenings. It is to be understood, however, that the liquid oil can have hard fat incorporated therein so long as the blend meets the overall qualifications as an oil that can be used to formulate the water-in-oil emulsion component of this invention. Preferred liquid oils are soybean oil, cotton seed oil, corn oil, sunflower oil, safflower oil, rape seed oil, and most preferably soybean oil. Thus, the edible oil to be used in the water-in-oil emulsion component of this invention can be selected from the group consisting of fats and oils. The use of a water-in-oil emulsion and natural pulpy tomato solids components for these novel spoonable tomato products provide several advantages. Thus, the combination of components imparts stability to the spoonable tomato products enabling them to be prepared in advance and stored for an appreciable period of time without undergoing significant deterioration as to flavor, color or texture. Further, the use of a water-in-oil emulsion component imparts to the spoonable tomato products the characteristics and stability similar to mayonnaise. These mayonnaise-like characteristics enable the spoonable tomato products of this invention to be conveniently incorporated into food products and fast foods. Still further, the use of a water-in-oil emulsion component imparts a more desirable mouth taste and feel to these novel spoonable tomato products enhancing their overall consumer eye appeal. A typical water-in-oil emulsion component of this invention comprises an edible oil, emulsifier, thickener and acidulent. The emulsifier phase may consist of egg, egg yolk powder, whey proteins, casein, soy protein, and the like. Preferably, however, whole egg and egg yolk powder are used in a proportion of about 2% w/w to about 8% w/w. The thickener may consist of a gum such as xanthan gum, acacia, tragacanth or the like and most preferably xanthan gum in an amount of about 0.1% w/w to about 2.0% w/w. The acidulents, which provide flavor, stability and pH adjustment to the overall emulsion component may include, for example, an organic acid such as vinegar and lemon juice in an amount of about 1% w/w to about 4% w/w. Further, the water-in-oil emulsion component may contain preservatives and flavoring agents. Such preservatives may include, for example, sodium benzoate and sodium EDTA while sugar and salt may be incorporated into the emulsion component as optional flavoring agents. Most preferably, a water-in-oil emulsion component of this invention comprises soybean oil, egg, egg yolk powder, xanthan gum, vinegar and lemon juice. In addition, sodium benzoate, sodium EDTA in about a 1% w/w solution, sugar, salt and water may be incorporated therein.

The novel spoonable tomato products comprise a tomato solids component wherein said tomato product contains said natural pulpy tomato solids component in an amount of about 15% w/w to about 80% w/w. Further, the natural pulpy tomato solids component contains natural pulpy tomato solids in an amount of about 75% w/w to about 95% w/w. As defined hereinabove, natural pulpy tomato solids may broadly comprise fresh tomatoes, cooked tomatoes, canned tomatoes, frozen tomatoes and the like. However, the natural pulpy tomato solids most preferably may be obtained from canned tomatoes. Other minor amounts of conventional tomato solids such as tomato paste, tomato juice, tomato sauce and tomato puree may also be incorporated therein provided, however, that the unique spoonable and natural pulpy texture and appearance is not destroyed or diminished. The incorporation of natural tomato solids, such as fresh, canned, cooked, and frozen tomatoes or the like, into the natural pulpy tomato solids component imparts to the spoonable tomato product a natural grainy, pulpy tomato texture. Typical tomato products of this invention comprise natural pulpy tomato solids, starch, thickener and acidulent. The natural pulpy tomato solids are incorporated therein to impart natural tomato flavor, color and a grainy, pulpy tomato texture. The starch or starch substitutes are added in an amount of about 2% w/w to about 4% w/w to give body or texture and viscosity to these novel tomato products. The thickener, as in the emulsion component, may also consist of a gum, such as xantham gum, acacia, tragacanth or the like and most preferably xantham gum in an amount of about 0.1% w/w to about 2% w/w. The use of thickener, such as gum, is added to prevent oozing of the liquid from the product and also to impart a better texture. The acidulent, which provides stability, may include an organic acid such as vinegar in an amount of about 1% w/w to about 4% w/w. Such acid is added to impart flavor and adjust the pH of the natural pulpy tomato solids component. Further, the natural pulpy tomato solids component may contain preservatives and flavoring agents. Such preservatives may include sodium benzoate while salt and tomato flavor may be incorporated therein as optional flavoring agents. Most preferably, a tomato product of this invention contains canned tomatoes, starch, xantham gum, and vinegar. In addition, sodium benzoate, salt and tomato flavor may be incorporated therein.

A method of producing a spoonable tomato product of this invention comprises preparing a water-in-oil emulsion component, preparing a natural pulpy tomato solids component, and combining said components in amounts proportioned to provide a spoonable product which is stable during storage. More specifically, the method comprises combining the said emulsion component and said natural tomato component in a ratio of about 1:3 to about 3:1, respectively, and most preferably in a ratio of about 1:2. At 1:4 of emulsion to tomato, there is a greater difficulty holding the product together, i.e., the emulsion starts to deteriorate and one must alter the gum and starch systems. However, more importantly, the product appeal of texture, physical appearance and mouth feel is diminished. The desired product characteristics are similarly diminished at a ratio of 4:1 of emulsion to tomato. Therefore, it is material to this invention that the components be proportioned to provide the spoonable product having such properties with stability of such properties upon use and storage. It has been found that each component may be prepared individually and thereafter combined to formulate a mechanical mixture. In addition, the method of preparation is desirable because spoonable tomato products are prepared in their ready-to-use state and stored for subsequent use without experiencing serious biodegradation and putrefaction. Thus, the method for preparing a novel spoonable tomato product eliminates the additional processing steps required following storage of conventional tomato products.

The water-in-oil emulsion component may be produced by combining an edible oil with an aqueous component in amounts proportioned under a sufficient rate of shear to provide a water-in-oil emulsion. In preparing said emulsion component, an edible oil and an aqueous component are combined in a ratio of about 3:2 to about 4:1 respectively. The edible oil, as stated above, may be selected from the group consisting of fats and oils and more preferably soybean oil. The aqueous component may comprise emulsifier, thickener and acidulent wherein each has been defined above. More preferably, an aqueous component of this invention comprises egg, egg yolk powder, gum, lemon juice, and vinegar. Further, the aqueous component may include preservatives and flavors illustrated above.

The natural pulpy tomato solids component is produced by heating an aqueous mixture consisting essentially of natural pulpy tomato solids and starch. Generally, the aqueous mixture is heated until the temperature reaches about 160° F. to 200° F. for about several minutes, depending upon the source of tomatoes. For natural tomatoes, the time may run as long as about 30 minutes at 160° F. to 200° F. For preprocessed tomatoes such as canned or frozen products, 190° F. may be used after five minutes. Further, upon reaching a temperature of about 150° F., the acidulent and optional tomato flavoring agent, may be added to the aqueous mixture. The natural pulpy tomato solids to be employed are natural tomato parts of tomatoes as defined hereinabove. As an optional means for preparing the natural pulpy tomato solids component, the starch may be pre-slurried with juice derived from natural pulpy tomato solids prior to being incorporated with the natural pulpy tomato solids. In addition, a thickener, such as a gum, and an acidulent, such as vinegar, may be added to the mixture of natural pulpy tomato solids and starch. Further, the mixture may contain preservatives and optional flavoring agents as illustrated above.

The invention, its principles, and objectives and its various embodiments and advantages will be further understood with reference to the following example and detailed description which illustrates the preparation of a spoonable tomato product and its formulation.

EXAMPLE

A spoonable tomato product was prepared wherein the following water-in-oil emulsion component and a natural pulpy tomato solids component were combined with simple mixing or dispersion to form a mechanical mixture in a ratio of about 1:2 respectively. This product had a shelf stability at room temperature in a container without vacuum or other preservation of at least three months and such shelf stability was at least equivalent to that of mayonnaise.

The water-in-oil emulsion component consisted of:

|  | % w/w |
| --- | --- |
| Soybean oil | 77.05 |
| Vinegar (120 grain) | 2.60 |
| Whole egg | 4.00 |
| Salt | 1.60 |
| Sugar | 2.00 |
| Lemon juice | 0.40 |
| Egg yolk powder | 2.00 |
| Sodium EDTA (1% solution) | 0.75 |
| Xantham gum | 0.10 |
| Sodium benzoate | 0.10 |
| Water | 9.40 |
| Total | 100.00 |

The method for preparing the water-in-oil emulsion consisted of dispersing the egg powder in the salt and sugar. The sodium benzoate was dissolved in a minimal amount of water. A pre-emulsion was prepared by adding the whole egg, water, said sodium benzoate solution, and sodium EDTA solution into a mixer which was gently mixed. The xantham gum was mixed with oil in a ratio of 1:10 % w/w respectively. The xantham gum mixture was then added to the pre-emulsified composition. Vinegar and lemon juice was then added to the emulsified mixture. The remaining oil was added slowly under high shear mixing until a uniform water-in-oil emulsion was formed.

The natural pulpy tomato solids component consisted of:

|  | % w/w |
| --- | --- |
| Canned diced tomatoes | 91.35 |
| Sugar | 2.00 |
| Vinegar | 1.50 |
| Sodium chloride | 0.25 |
| Sodium benzoate | 0.10 |
| Starch | 4.30 |
| Tomato flavor | 0.30 |
| Xantham gum | 0.20 |
| Total | 100.00 |

The xantham gun was dispersed in the sugar and sodium chloride. Sodium benzoate was then dissolved in a minimum amount of water. The dissolved sodium benzoate was added to the canned diced tomatoes. The gum mixture was then added to the natural pulpy tomato solids mixture with mild agitation. The starch was then added with agitation. The entire mixture was then heated until the temperature reached 150° F. wherein the vinegar and tomato flavor was added. The resultant mixture was then heated to 190° F. and held for 5 minutes.

The present invention may, of course, be carried out in other specific ways than those herein set forth without departing from the spirit and the essential characteristics of the invention. The present embodiments are, therefore, to be considered in all respects as illustrative and not restrictive and all changes coming within the meaning and equivalency range of the appended claims are intended to be embraced herein.

What is claimed is:

1. A spoonable tomato product comprising a water-in-oil emulsion component and a natural pulpy tomato solids component consisting essentially of actual pieces of natural tomatoes wherein said components are in amounts proportioned to provide a spoonable product having a natural grainy pulpy tomato texture which is stable during use and storage.

2. The tomato product of claim 1 wherein said emulsion component and said natural pulpy tomato solids component are present in a ratio of about 1:3 to about 3:1 respectively.

3. The tomato product of claim 1 wherein said emulsion component and said tomato solid component are present in a ratio of about 1:2 respectively.

4. The tomato product of claim 1 wherein said tomato product has the characteristics and stability similar to mayonnaise.

5. The tomato product of claim 1 wherein said tomato product contains said emulsion in an amount of about 15% w/w to about 80% w/w.

6. The tomato product of claim 5 wherein said water-in-oil emulsion component contains edible oil in an amount of about 60% w/w to about 80% w/w.

7. The edible oil of claim 6 wherein said oil is selected from the group consisting of fats and oils.

8. The edible oil of claim 6 wherein said oil is soybean oil.

9. The water-in-oil emulsion component of claim 1 wherein said emulsion comprises edible oil, emulsifier, thickener and acidulent.

10. The water-in-oil component of claim 9 wherein said emulsion contains preservatives and flavoring agents.

11. The water-in-oil emulsion of claim 9 wherein said emulsion comprises soybean oil, egg, egg yolk powder, gum, vinegar and lemon juice.

12. The tomato product of claim 1 wherein said tomato product contains said natural pulpy tomato solids component in an amount of about 15% w/w to about 80% w/w.

13. The natural pulpy tomato solids component of claim 12 wherein said tomato component comprises natural pulpy tomato solids in about 75% w/w to about 95% w/w.

14. The natural pulpy tomato solids of claim 13 wherein said solids are selected from the group consisting of fresh tomatoes, cooked tomatoes, and frozen tomatoes.

15. The natural pulpy tomato solids of claim 13 wherein said solids are canned tomatoes.

16. The natural pulpy tomato solids component of claim 12 comprising natural pulpy tomato solids, starch, thickener, and acidulent.

17. The natural pulpy tomato solids component of claim 12 containing preservatives and flavoring agents.

18. The natural pulpy tomato solids component of claim 12 comprising canned tomatoes, starch, gum, and vinegar.

19. A method of producing a spoonable tomato product comprising preparing a water-in-oil emulsion component, preparing a natural pulpy tomato solids component consisting essentially of actual pieces of natural tomatoes, and combining said components in amounts proportioned to provide a spoonable product having a natural, grainy pulpy tomato texture which is stable during use and storage.

20. The method of claim 1 wherein said emulsion component and said tomato component are combined in a ratio of about 1:3 to about 3:1 respectively.

21. The method of claim 19 wherein said emulsion component and said tomato component are combined in a ratio of about 1:2 respectively.

22. The method of claim 19 wherein said emulsion component is prepared from an edible oil and an aqueous component combined in a ratio of about 3:2 to about 4:1.

23. The method of claim 22 wherein said edible oil is selected from the group of fats and oils.

24. The method of claim 23 wherein said edible oil is soybean oil.

25. The method of claim 22 wherein said aqueous component comprises emulsifier, thickener, and acidulent.

26. The method of claim 25 wherein said aqueous component comprises preservatives and flavoring agents.

27. The method of claim 25 wherein said aqueous component comprises egg, egg yolk powder, gum, lemon juice, and vinegar.

28. The method of claim 19 wherein said tomato component is produced by heating an aqueous mixture consisting essentially of natural pulpy tomato solids and starch.

29. The method of claim 28 wherein said mixture contains thickener and acidulent.

30. The method of claim 29 wherein said mixture contains preservative and flavoring agents.

31. The method of claim 28 wherein said thickener and acidulent are gum and vinegar.

32. The method of claim 29 wherein said starch is preslurried with juice derived from natural pulpy tomato solids.

* * * * *